July 1, 1958 F. A. REDMOND 2,841,038
SAW TOOL ATTACHMENT
Filed Jan. 22, 1957 3 Sheets-Sheet 1

Frank A. Redmond
INVENTOR.

BY *(signature)*
Attorneys

July 1, 1958

F. A. REDMOND 2,841,038

SAW TOOL ATTACHMENT

Filed Jan. 22, 1957

Frank A. Redmond
INVENTOR.

BY

July 1, 1958

F. A. REDMOND 2,841,038

SAW TOOL ATTACHMENT

Filed Jan. 22, 1957

Frank A. Redmond
INVENTOR.

BY
Attorneys

United States Patent Office 2,841,038
Patented July 1, 1958

2,841,038

SAW TOOL ATTACHMENT

Frank A. Redmond, Chattanooga, Tenn.

Application January 22, 1957, Serial No. 635,193

5 Claims. (Cl. 76—77)

This invention relates to an attachment for a saw tool utilized in setting saws and more particularly to a device for feeding the saw and for adjustment for feed or tooth height to ensure that the saw tooth will properly be placed above the set anvil.

The primary object of the present invention resides in the provision of an attachment for any conventional manually operated hand saw sets for eliminating the slow and tedious operations heretofore necessary by the saw setter which includes counting the teeth as the saw is advanced and also holding the saw in proper alignment as regards to the height of the teeth to center the teeth over the anvil.

The advantages of the saw tool attachment lie in the more accurate, uniform and superior job of setting saw teeth while at the same time greatly speeding the operation and greatly relieving the operator of physical and nervous strains, thus making the entire setting operation an easy matter for many people, including those who are handicapped by nerve and eye disorders.

A further object of the present invention resides in the provision of an attachment for a saw setting tool that is simple in construction and manufacture, capable of being readily installed on various existing models of hand saw setting tools and which can be utilized to set the teeth of various types of saws while being inexpensive to construct, thereby permitting wide use and distribution.

These, together with the various ancillary objects and features of the invention which will become apparent as the following description proceeds, are attained by this attachment for a saw setting tool, a preferred embodiment of which has been illustrated in the accompanying drawings, by way of example only, wherein.

Figure 1:
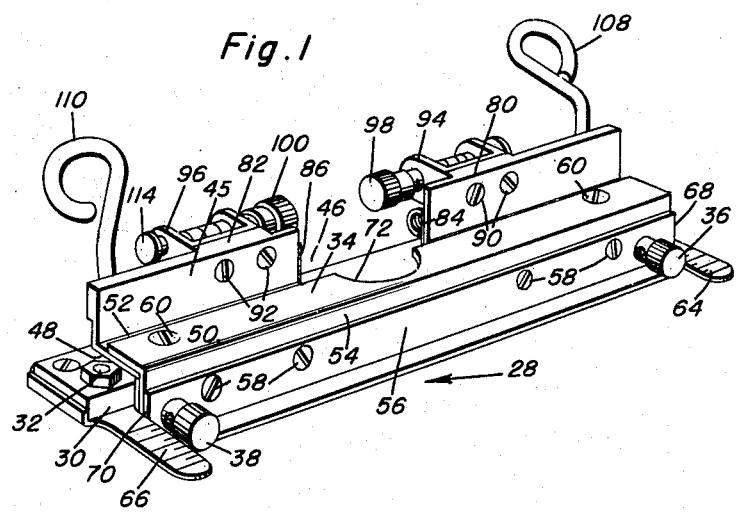
Figure 1 is a perspective view of the invention.
Figure 2:
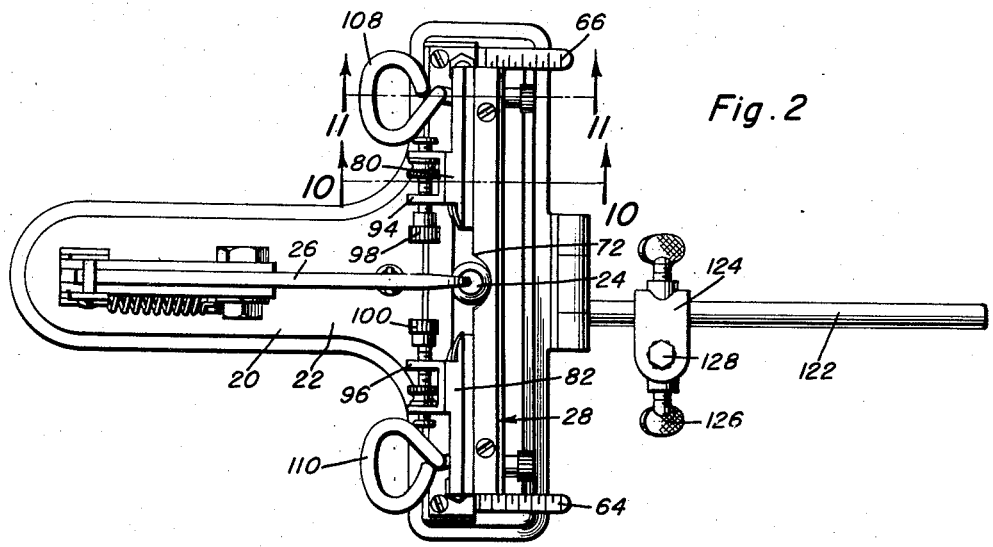
Figure 2 is a top plan view of a saw setting tool with the attachment mounted thereon.
Figure 3:
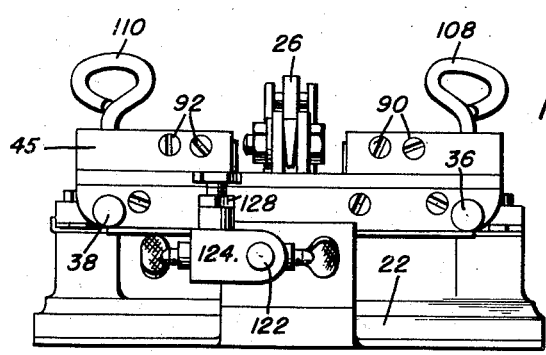
Figure 3 is a front elevational view of the invention shown installed on a saw setting tool.

With continuing reference to the accompanying drawings wherein like reference numerals designate similar parts throughout the various views, reference numeral 20 generally designates a saw setting tool having a base 22 provided with an anvil 24 and a pivotally mounted striker 26, all of which is conventional. In order to enable the tool 20 to more easily perform its functions and to reduce the amount of eye strain and other physical and nervous strain on the operator of the tool 20, the attachment comprising the present invention and generally designated by reference numeral 28 is provided.

The attachment 28 includes a mounting bar 30 adapted to be secured by suitable fasteners as at 32 to the base 22 of the tool 20.

Figure 11:
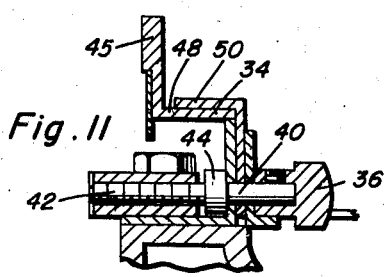
Figure 11 is a sectional detailed view as taken along the plane of line 11—11 in Figure 2.

Adjustably mounted on the mounting bar 30 is a frame 34 adjustably held in place by thumb screws 36 and 28 or other suitable fasteners. The thumb screw 36 provides a pivotal connection between the frame 34 and the bar 30 while the thumb screw 38 is adjustably threaded on the bar 30 so as to allow for an adjustment of the spacing between the frame 34 and the mounting bar 30. The construction of the thumb screw 36 can be best seen in Figure 11 and it is noted that the thumb screw includes a shank 40 which is threaded on the end, as at 42, and which has a collar 44 positioned thereabout and engageable with the frame 34.

The frame 34 includes a back 45 having an opening 46 therein and having an integrally formed flange 48. The back 45 and integrally formed flange 48 therefore form a member of substantially L shape in cross section. Overlying and secured to the horizontal flange 48 is another horizontal flange 50 which cooperates with the flange 48 to form a table having a groove 52 therein. The groove 52 is for accommodating the set in the teeth of the saw being worked upon. Integrally formed with the flange 50 is a downwardly extending flange 54 which has a plate 56 secured thereto as by fasteners 58. It is noted that fasteners 60 are utilized to attach the flange 50 to the flange 48. The plate 56 and the downwardly extending flange 54 form an apron through which the adjusting screws 36 and 38 extend. Held in place by the fasteners 32 are vernier plates 64 and 66 which cooperate with the edges, as at 68 and 70, to form verniers for aligning the entire frame 34. The table is recessed arcuately, as at 72, to accommodate the anvil 24.

The back 45 has integrally formed therewith or attached thereto guides 80 and 82 for reception of feed pawls 84 and 86. The feed pawls are normally urged by means of springs 88 and 90 to a retracted position, as can be best seen in Figure 6. These springs are apparent in Figure 5 and are terminally secured to the guides 80 and 82 and to the feed pawls 84 and 86. Affixed by suitable fasteners to the back and the integrally formed guides 80 and 82, the fasteners being shown at 90 and 92 respectively, are channel-shaped brackets 94 and 96 in which adjusting members 98 and 100 are engaged.

Figure 5:
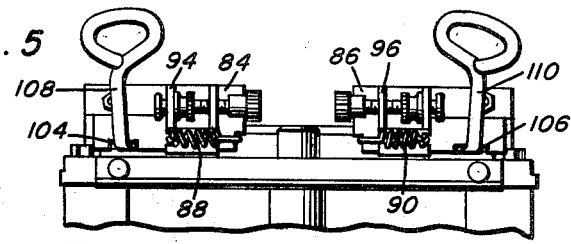
Figure 5 is a partial rear elevational view of the assembly illustrating in particular the stop means for the handles, as taken along the plane of line 5—5 in Figure 4.
Figure 6:
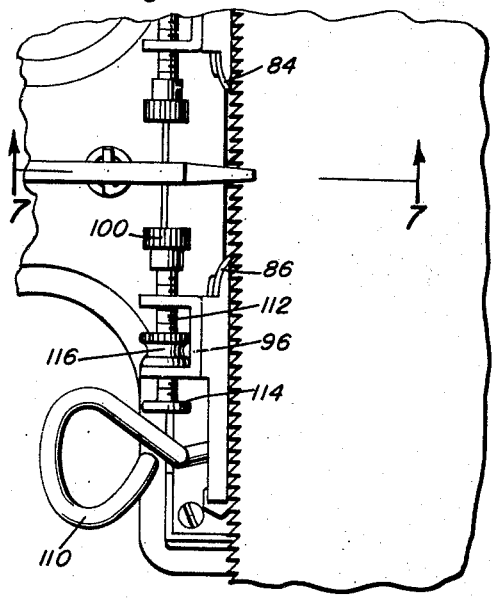
Figure 6 is a partial plan view of the invention illustrating the feed pawls in a retracted position.
Figure 7:
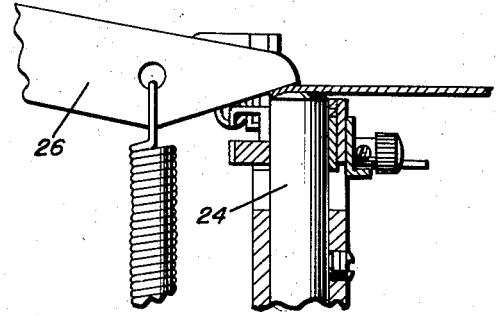
Figure 7 is a sectional detailed view as taken along the plane of line 7—7 in Figure 6.
Figure 8:
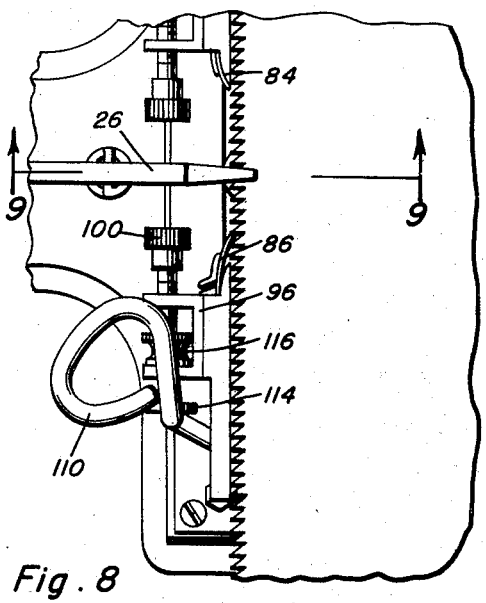
Figure 8 is an enlarged plan view illustrating the feed pawls in an extended or feeding position.
Figure 10:
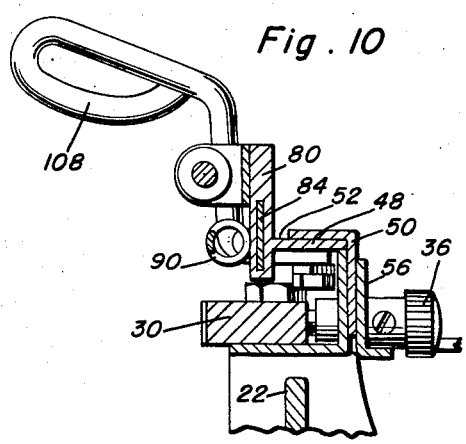
Figure 10 is a sectional detailed view as taken along line 10—10 in Figure 2.

As can be seen best in Figure 5, the feed pawls 84 and 86 are provided with recesses or notches 104 and 106 therein through which handles 108 and 110 extend. The handles are pivotally attached to the frame 34 by the same fasteners 60 that attach the flanges 48 and 50 together. Hence, movement of the handles will cause movement of the feed pawls from the position shown in Figure 6 to the position shown in Figure 8. It is to be noted that the feed pawls are moved separately so as to feed the teeth of the blade in opposite directions so that the alternate teeth on the blade may be set in opposite directions as is conventional. The pawls when actuated engage the teeth and move the blade a distance equivalent to two teeth so as to properly set a tooth to be worked upon over the anvil. The adjusting screws 98 and 100, the individual construction of which can be best seen in Figure 6, each include a threaded shank 112 having a head 114 at the end thereof adapted to be engaged by the handles and further having a threaded collar 116 secured to the brackets 94 and 96 through which the threaded shank 112 is threadedly engaged.

Figure 9:
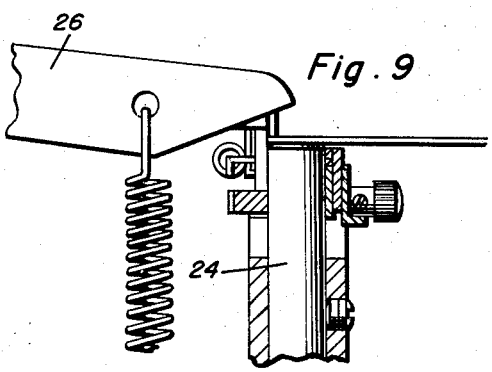
Figure 9 is a sectional detailed view as taken along the plane of line 9—9 in Figure 8.

With the various handles in a non-extended position, the striker 26 can be urged downwardly to set a tooth. However, the striker 26 must be in the raised position, as is shown in Figure 9, when it is desired to actuate a handle so as to move the blade across the edge of the anvil 24.

Figure 4:
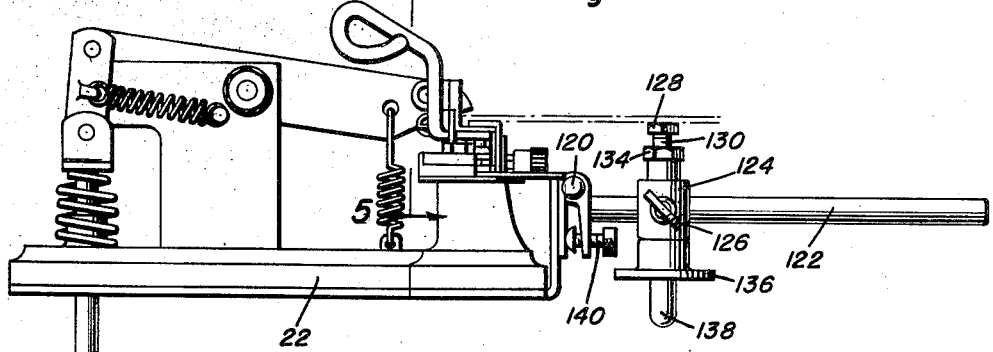
Figure 4 is a side elevational view of the assembled saw setting tool and attachment, illustrating a conventional hand saw supported thereon in phantom lines.
Figure 12:
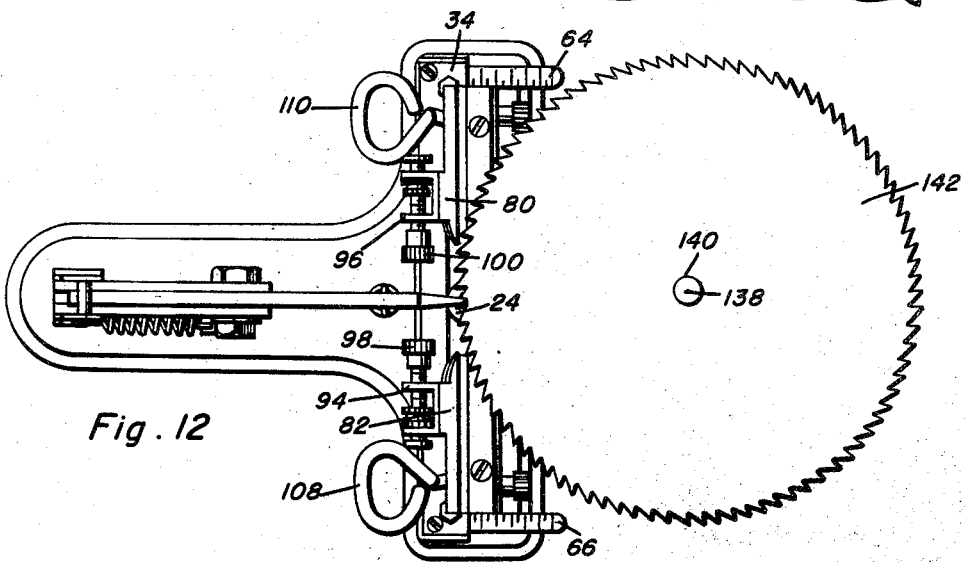
Figure 12 is a plan view of the invention illustrating the manner in which the teeth on a circular saw blade can be set.

There is pivotally secured or hingedly secured to the base 22, as at 120, a rod 122 on which a guide 124 is slidably mounted and adapted to be locked in place by means of a fastener 126. The guide 124 has a suitable adjustable head 128 threadedly secured, as at 130, in an internally threaded portion 134 of the guide so as to provide an adjustable support for a saw blade, see Figure 4. For supporting circular blades, the guide 124 is provided with a plate-like collar 136 and a stem 138 which is adapted to extend through the aperture, as at 140, in a circular saw blade 142, see Figure 12.

When used for setting hand saws, the hand saw is placed with the first tooth to be set at the broad end of the saw in proper position over the anvil 24. The teeth are positioned snugly against the back 45, with the saw teeth being over the recess or groove 52. The set handle 108 or 110 not to be used on the side of the set is fully retracted. The feed handle to be used for the set is then pulled toward the center of the device until the pawl corresponding thereto has engaged the saw teeth and advanced the hand saw to a point where the second tooth to be set in the direction of feed is accurately placed between the anvil 24 and the striker 26. Then, the feed adjustment stop screw 98 or 100 is adjusted to stop the advance of the feed handle and locked in place by means of the tightening lock nut 116. The hand saw being worked upon is level with the table by adjusting the elevation of the arm 122 and the seat 128, utilizing the level adjustment screw, as at 140. This side of the hand saw is now ready for setting, and the first tooth to be set at the widest part of the blade is struck by the striker on top of the set anvil. The saw is then advanced two teeth by pulling the feed handle toward the center of the device and firmly against the stop. Then, this tooth is struck by the striker and this operation is repeated until every other tooth the full length of the saw has been set. When one side of the saw blade has been set, the ends of the saw are reversed and the blade turned over, starting at the wide end of the blade with the feed handle used on the first side set being completely retracted, disengaging the pawl, and the opposite feed handle adjusted and the entire operation above outlined repeated.

When setting circular saws, the present invention does not incorporate any automatic feed, but utilizes the same saw setting tool utilized on the hand saws so that both feed handles are fully retracted. The supporting arm 122 with the fulcrum, as at 138, turned up is adjusted, after the circular saw has been mounted on the fulcrum through the hole 140 therein. The fulcrums may be replaceable so that different size saws may be accommodated. The saw blade is then level with the top of the anvil and the base of the fulcrum by elevation of the bar or arm 122 using adjusting screw 140. The adjusting assembly 124 is then slid along the rod 122 until the tooth to be set is in proper relation to the set anvil and the striker. The tooth is then set by the striker descending on it on top of the set anvil and the blade is turned manually until all teeth to be set on the first side of the blade are set and then the sides of the blade are reversed and the entire operation repeated until all teeth have been set.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a saw setting tool to feed, hold and gauge the set of saws, said attachment including a mounting bar, a frame adjustably secured to said bar, said frame having a table and having a back and an apron extending substantially normal to said table, said table having a groove therein to accommodate the set in saw teeth, said back having an opening to expose a saw tooth to be set, a pair of feed pawls slidably mounted on said back, and handles engaging said feed pawls for actuating said feed pawls, and means for limiting the stroke of said pawls, said means including adjustable stops adjustably secured to said back, said handles engaging said stops to limit movement of said handles and hence of said pawls.

2. An attachment for a saw setting tool to feed, hold and gauge the set of saws, said attachment including a mounting bar, a frame adjustably secured to said bar, said frame having a table and having a back and an apron extending substantially normal to said table, said table having a groove therein to accommodate the set in saw teeth, said back having an opening to expose a saw tooth to be set, a pair of feed pawls slidably mounted on said back, and handles engaging said feed pawls for actuating said feed pawls, said feed pawls having arcuate spring ends movable into alignment with said groove to move a saw therewith, said feed pawls having recesses therein, said handles being pivoted to said frame and being engaged with said pawls in said recesses.

3. An attachment for a saw setting tool to feed, hold and gauge the set of saws, said attachment including a mounting bar, a frame adjustably secured to said bar, said frame having a table and having a back and an apron extending substantially normal to said table, said table having a groove therein to accommodate the set in saw teeth, said back having an opening to expose a saw tooth to be set, a pair of feed pawls slidably mounted on said back, and handles engaging said feed pawls for actuating said feed pawls, said feed pawls having arcuate spring ends movable into alignment with said groove to move a saw therewith, said feed pawls having recesses therein, said handles being pivoted to said frame and being engaged with said pawls in said recesses, and means for limiting the stroke of said pawls, said means including adjustable stops adjustably secured to said back, said handles engaging said stops to limit movement of said handles and hence of said pawls.

4. An attachment for a saw setting tool to feed, hold and gauge the set of saws, said attachment including a mounting bar, a frame adjustably secured to said bar, said frame having a table and having a back and an apron extending substantially normal to said table, said table having a groove therein to accommodate the set in saw teeth, said back having an opening to expose a saw tooth to be set, a pair of feed pawls slidably mounted on said back, and handles engaging said feed pawls for actuating said feed pawls, said feed pawls having recesses therein, said handles being pivoted to said frame and being engaged with said pawls in said recesses, and means for limiting the stroke of said pawls, said means including adjustable stops adjustably secured to said back, said handles engaging said stops to limit movement of said handles and hence of said pawls.

5. An attachment for a saw setting tool to feed, hold and gauge the set of saws, said attachment including a mounting bar, a frame adjustably secured to said bar, said frame having a table and having a back and an apron extending substantially normal to said table, said table having a groove therein to accommodate the set in saw teeth, said back having an opening to expose a saw tooth to be set, a pair of feed pawls slidably mounted on said back, and handles engaging said feed pawls for actuating said feed pawls, said feed pawls having arcuate spring ends movable into alignment with said groove to move a saw therewith, said feed pawls having recesses therein, said handles being pivoted to said frame and being engaged with said pawls in said recesses, and means for limiting the stroke of said pawls, said means including adjustable stops adjustably secured to said back, said handles engaging said stops to limit movement of said handles and hence of said pawls, and means for adjusting said frame to accommodate different size saw teeth including an adjusting screw engaged in said apron and engaging said bar to move said frame with respect to said bar upon adjustment of said screw.

References Cited in the file of this patent

UNITED STATES PATENTS

| | | |
|---|---|---|
| 533,611 | Rupsch | Feb. 5, 1895 |
| 680,484 | Gottsmann | Aug. 13, 1901 |
| 1,859,363 | Hart | May 24, 1932 |
| 2,356,448 | Daggett | Aug. 22, 1944 |